United States Patent [19]

Hamm

[11] 4,380,853
[45] Apr. 26, 1983

[54] TOOL MOUNT ASSEMBLY METHOD

[75] Inventor: Nicholas Hamm, Vineland, Canada

[73] Assignee: Deere & Company, Moline, Ill.

[21] Appl. No.: 226,292

[22] Filed: Jan. 19, 1981

[51] Int. Cl.³ .................. B21H 7/00; B21K 19/00
[52] U.S. Cl. ................................ 29/148.3; 29/436; 172/572
[58] Field of Search ............. 29/148.3, 436, 434; 172/570, 571, 572, 573

[56] References Cited

U.S. PATENT DOCUMENTS

| | | | |
|---|---|---|---|
| 1,694,626 | 12/1928 | Roberts | 29/436 X |
| 2,616,352 | 11/1952 | Johnston | |
| 2,669,171 | 2/1954 | Silver et al. | |
| 2,798,419 | 7/1957 | Moricean | 172/572 |
| 2,979,138 | 4/1961 | Martensen | 172/579 |
| 3,405,767 | 10/1968 | Thompson | 172/572 |
| 3,706,345 | 12/1972 | Patterson et al. | 172/572 |

Primary Examiner—Carl E. Hall

[57] ABSTRACT

A torsion bar disk gang mounting assembly includes a shaft pivotally suspended from a disk frame. A rectangular tube receives a portion of the shaft. A pair of disk gang support arms are pivotally coupled to the shaft and extend generally rearwardly therefrom. The arms are fixed to opposite ends of the tube and support a disk gang at their distal ends. A torsion bar is resiliently coupled between the tube and the shaft to bias the disk gang downwardly. A method of making such a disk gang mounting assembly includes the steps of assembling the shaft, tube and torsion bar, then fixing the arms to ends of the tube. The shaft is then pivoted with respect to the tube and arms to establish a predetermined preload in the torsion bar. A stop arm is then fixed to the shaft in engagement with an abutment on one of the arms to maintain the preload in the torsion bar and to limit downward movement of the disk gang. Coupling holes are then drilled in the ends of the shaft with a certain orientation with respect to the arms so that consecutive shafts may be coupled together with coupling collars.

3 Claims, 3 Drawing Figures

TOOL MOUNT ASSEMBLY METHOD

BACKGROUND OF THE INVENTION

This invention relates to an improved method of making a tool mounting means for an agricultural implement, and more particularly to a method of making a torsion bar disk gang mounting assembly.

Current production torsion bar-type disk gang mounting assemblies, such as described in assignee's U.S. Pat. No. 3,706,345, include a plurality of disk gangs each suspended from a section of cylindrical tubular shaft. Adjacent shaft sections are coupled together by having their ends butted together inside of a cylindrical apertured coupling collar. The shaft ends are then held together by pins inserted through the collar apertures and through corresponding radial coupling bores in the shaft ends. The conventional method of constructing and assembling each gang section was to first drill the radial coupling bores through the shaft ends which were to be received by the collars. A radial torsion bar hole is then drilled through the shaft parallel to the coupling bores. One end of a torsion bar is then inserted into this hole and welded in place. The remaining parts, including two gang support arms and a rectangular tubular member, are then assembled onto the shaft so that the other end of the torsion bar is held between an L-shaped bracket on one support arm and an inner surface of the tubular member. Both gang support arms are then welded to respective ends of the tubular member. If not already, arms are positioned with their longitudinal axis angularly displaced 21° from the axis of the coupling bores. With the gang support arms so positioned, a stop arm is welded to the shaft in a position in engagement with one of a pair of pivot stops rigidly mounted on the other gang support arm. In most cases, this process would result in an assembly in which the torsion bar was in an unloaded or unbiased condition. However, due to tolerances in the torsion bars and in other parts of the assembly, the torsion bars in some of the gang assemblies could be slightly preloaded or biased. When the plurality of disk gangs are then mounted on the disk frame with their shafts pinned together, the varying amounts of preload would cause different ones of the gang assemblies to hang at different heights. In order to produce a multiple gang assembly with uniform gang heights, it is then necessary to add shims to or build up by welding certain ones of the pivot stops. Still, due to this uneven preloading, it is not uncommon for this assembly process to produce a multiple gang disk assembly with as much as a 2-inch difference in ground penetration between different gangs.

SUMMARY OF THE INVENTION

An advantage of the present invention is that it provides a method for making a disk gang support assembly with reduced free play.

Another advantage of the present invention is that it provides a method for making a disk gang support assembly with improved uniformity with respect to ground penetration across consecutive disk gangs.

Another advantage of the present invention is that it provides a method of making a disk gang support assembly with a pretorqued or preloaded torsion bar.

These and other advantages are achieved according to the instant invention which provides an improved method of assembling a torsion bar-type disk gang support assembly. In this improved method, the shaft and torsion bar are assembled inside of the tube with the torsion bar coupled between the shaft and the tube. Disk gang support arms are then fixed to the ends of the tube with the shaft pivotally extending through apertures in the gang support arms. The shaft is then pivoted with respect to the tube to apply a predetermined preload or torque to the torsion bar. Then, a stop arm is fixed to the shaft in engagement with a corresponding stop fixed to one of the gang support arms so that this preload is maintained in the torsion bar. Finally, coupling holes are drilled in the ends of the shaft with a predetermined orientation with respect to the gang support arms.

DETAILED DESCRIPTION

Figure 1:
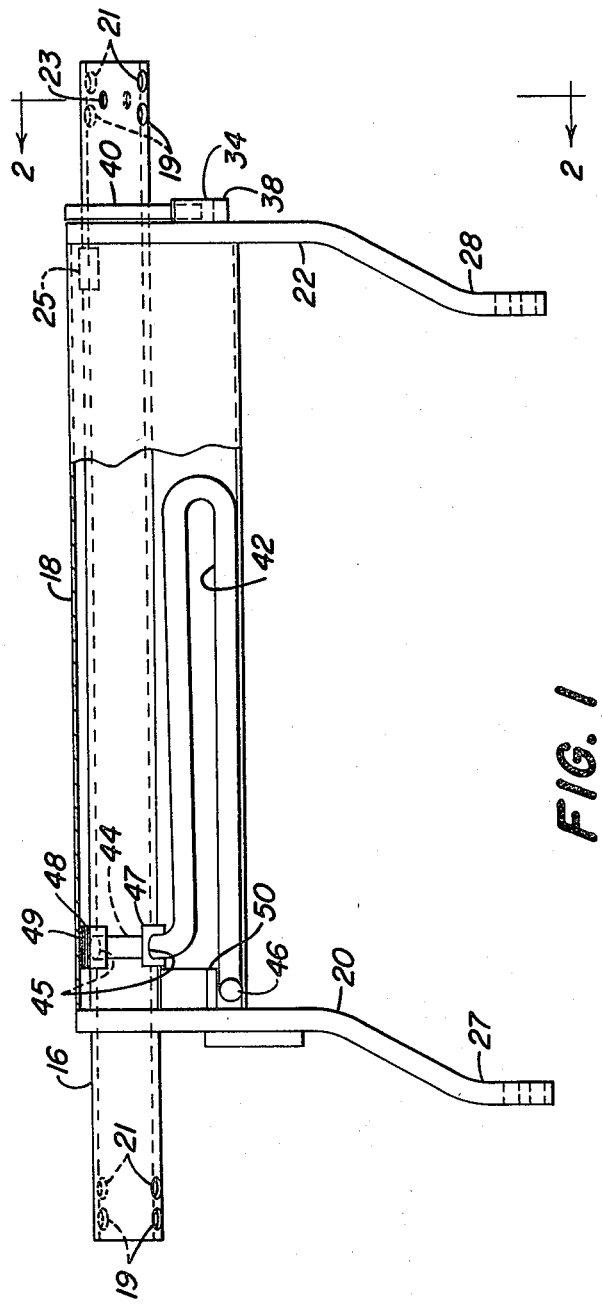
FIG. 1 is a partial sectional view looking from above a disk gang assembly constructed according to applicant's method.
Figure 2:
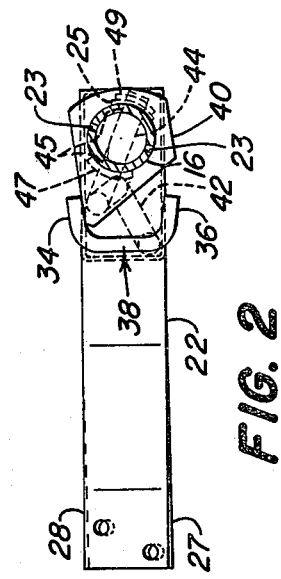
FIG. 2 is an end view in the direction of arrows 2—2 of FIG. 1.

A disk gang assembly includes a tubular shaft or support 16 which may be pivotally suspended from a disk frame member (not shown) as disclosed in assignee's U.S. Pat. No. 3,706,345 to Patterson et al, the specification of which is herein incorporated by reference. The shaft 16 is received by a rectangular tubular member 18. Each end of shaft 16 includes a pair of aligned coupling apertures or bores 19 and 21 drilled through opposite sides of the shaft 16. The coupling apertures 19 and 21 permit the shaft 16 to be pin-coupled to an adjacent shaft (not shown) by means of an apertured coupling collar (not shown) which receives the butted-together ends of the consecutive shafts 16. One end of shaft 16 includes a torquing aperture 23 which is drilled radially through one side of the shaft 16. A concave rectangular abutment washer 25 is welded to the outer surface of shaft 16. A pair of apertured support arms 20 and 22 are fixed to the outer ends of the tube 18 and extend substantially rearwardly therefrom to support a disk gang (not shown), also as disclosed in U.S. Pat. No. 3,706,345. As is well-known in the art, and as shown in FIG. 2, a small (approximately ⅛") vertical offset is provided between the trailing ends 27 and 28 of arms 20 and 22 to compensate for the difference in ground-engaging forces on the opposite ends of the disk gang (not shown).

Upper and lower pivot stops 34 and 36 are comprised of the legs of a U-shaped member 38 fixed to the arm 22. Stops 34 and 36 are engageable with an apertured stop arm 40 which is fixed to the shaft 16. A torsion bar spring 42 biases the tube 18 and the arms 20 and 22 downwardly and counterclockwise with respect to the shaft 16 (as viewed in FIG. 2) and maintains stop 34 in engagement with stop arm 40, as shown in FIG. 2. End 44 of torsion bar 42 projects through aligned bores 45 which extend radially through the shaft 16 along an axis which is perpendicular to the axis of aperture 23. End 44 is also received by a plurality of concave rectangular washers 47, 48, and 49. Washers 47 and 48 are welded to surface of shaft 16 and provide additional bearing surfaces for pivotally engaging end 44 of torsion spring 42. Washer 49 is welded to the end 44 to prevent end 44 from being withdrawn from the bores 45. The concave rectangular shape of nested washers 48 and 49 permits only a slight relative pivoting between shaft 16 and end 44 of torsion bar 42. The other end 46 of the torsion bar 42 is held in place between the inner wall of the tube 18 and an L-shaped bracket 50 fixed to the arm 20. Abutment washer 25 and stop arm 40 are engageable with arm 22 to limit axial movement of the tube 18 and arms 20 and 22 relative to the shaft 16.

The improved method of assembling the above-described assembly includes first drilling the torsion bar receiving bores 45 radially through the shaft 16. Next, tool-receiving (or torquing) apertures 23 are drilled through shaft 16 perpendicular to the axis of bores 45. End 44 of torsion bar 42 is then inserted into bores 45 and washer 49 is welded to end 44. Torsion bar 42 and shaft 16 are then inserted into the tube 18. Arms 20 and 22 are then slid over the ends of shaft 16 and welded to opposite ends of tube 18 so that the bracket 50 is next to end 46 of torsion bar 42 and so that arms 20 and 22 are substantially parallel to each other, but with the small offset described previously. Next, the apertured stop arm 40 is slid over shaft 16 to a position adjacent arm 22 with the rearward end of stop arm 40 disposed between stops 34 and 36 of U-shaped member 38.

Figure 3:
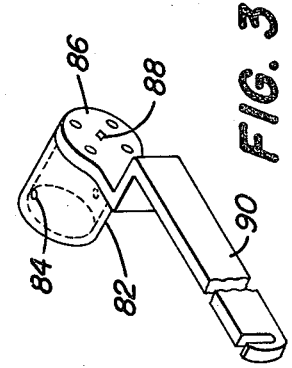
FIG. 3 is a view of a preloading tool for use with the present invention.

Next, the shaft 16 is pivoted counterclockwise with respect to the tube 18 and arms 20 and 22 (as viewed in FIG. 2) to establish a preload torque of approximately 60 lb.-ft. in the torsion bar 42. This amount of preloading is generally achieved when the axis of bores 45 is displaced by an angle of approximately 21° from the longitudinal axis of the arms 20 and 22, as seen in FIG. 2. This preloading may be accomplished by attaching a preloading attachment 80 (see FIG. 3) to an end of shaft 16. For example, the preloading attachment 80 may be comprised of a cylindrical sleeve 82 adapted to fit over the end of shaft 16 and including apertures 84 which may be registered with the torquing apertures 23 in shaft 16. A pin (not shown) may then be inserted through apertures 84 and 23 so that the sleeve 82 and shaft 16 must rotate together. An end plate 86 is fixed to the end of the sleeve 82 and may include a centrally located square hole 88. A torquing arm 90 includes one end fixed to the end plate 86. A weight (not shown) may then be suspended from the other end of the torquing arm 90 to pivot the shaft 16 with respect to the tube 18 and to apply the proper preload to torsion bar 42. As an alternative to the torque arm and weight, the torsion bar may be pre-torqued with the aid of a standard torque wrench fitted into the square hole 88 in the end plate.

After torsion bar 42 has been pre-torqued to 60 lb.-ft., then stop arm 40 is welded to shaft 16 in a position wherein stop arm 40 is in engagement with upper stop 34, as seen in FIG. 2, thereby holding the pre-torque in torsion bar 42. This engagement also prevents arms 20 and 22 from pivoting downward and counterclockwise with respect to the shaft 16 as viewed in FIG. 2. However, arms 20 and 22 may pivot upwards and clockwise with respect to the shaft 16 against the bias of torsion bar 42 until lower stop 36 engages stop arm 40. The coupling apertures 19 and 21 are then drilled through the opposite ends of the shaft 16 with their axis parallel to the axis of bores 45 and angularly displaced 21° with respect to the longitudinal axis of the arms 20 and 22.

In this manner, all of a plurality of disk gang assemblies may be uniformly pre-torqued or preloaded. This uniform preloading reduces the free play in the assembly and results in a more uniform ground penetration depth across adjacent disk gangs.

I claim:

1. A method of making an agricultural implement assembly having a support and a tool mounting member pivotally suspended from the support and having an abutment member fixed thereto, the method comprising the steps of:

coupling a resilient member between the support and the mounting member;

pivoting the mounting member with respect to the support to establish at least a predetermined preload in the resilient member; and after the resilient member is preloaded, fixing a stop member to the support so that the stop member engages the abutment member, the stop and abutment members cooperating to limit downward pivoting of the mounting member relative to the support and to maintain at least the predetermined preload in the resilient member; and after the resilient member is preloaded, forming attaching means on an end of the support for attaching the support to an adjacent support, the attaching means being oriented at a predetermined angular position with respect to the mounting member.

2. A method of making an agricultural implement assembly having a support and a tool mounting member pivotally suspended from the support and having an abutment member fixed thereto, the method comprising the steps of:

coupling a resilient member between the support and the mounting member;

pivoting the mounting member with respect to the support to establish a predetermined torque preload in the resilient member of at least 60 lb.-ft.;

after the resilient member is preloaded, fixing a stop member to the support so that the stop member engages the abutment member, the stop and abutment members cooperating to limit downward pivoting of the mounting member relative to the support and to maintain at least the predetermined preload in the resilient member; and after the resilient member is preloaded, forming attaching means on an end of the support for attaching the support to an adjacent support, the attaching means being oriented at a predetermined angular position with respect to the mounting member.

3. A method of making a disk gang support assembly having a tube, a shaft extending through the tube, gang support arms pivotally suspended from the shaft, fixed to ends of the tube and having an abutment fixed thereto, and a torsion bar coupled between the shaft and the tube for biasing the disk gang downwardly, the method comprising the steps of:

pivoting the shaft with respect to the support arms and the tube to establish at least a predetermined preload in the torsion bar;

after the torison bar is preloaded, fixing a stop arm to the shaft adjacent one of the support arms and in a position engaging the abutment, the stop arm and the abutment cooperating to maintain the predetermined preload and to limit downward movement of disk gang; and then drilling coupling holes radially through an end of the shaft at a predetermined angle with respect to a longitudinal axis of the support arms, the coupling holes being for coupling adjacent shafts together.

* * * * *